Patented May 12, 1931

1,804,840

UNITED STATES PATENT OFFICE

PAUL NAWIASKY, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

MANUFACTURE OF GREY TO BLACK VAT DYESTUFFS

No Drawing. Application filed January 6, 1927, Serial No. 159,502, and in Germany January 12, 1926.

I have found that grey to black vat dyestuffs with excellent properties as regards fastness, may be obtained by treating aminodibenzanthrone with methyl esters of sulfuric acid in the absence of agents capable of combining with acids. The said new vat dyestuffs dissolve to a reddish violet solution in concentrated sulfuric acid, the color of the solution changing rather quickly to dark bluish green on addition of solid potassium nitrate, and on addition of aqueous nitric acid first to green and blue and then to dull red and finally to brown red. The said dyestuffs are dissolved with more or less difficulty in aniline to a green blue solution and with still greater difficulty in boiling trichlorbenzene to a bluish solution with a red fluorescence.

The following examples will further illustrate how the invention may be carried into practical effect but the invention is not limited to these examples. The parts are by weight.

Example 1

32 parts of methyl alcohol are run into 120 parts of concentrated sulfuric acid, at a temperature of about 40° C., whereupon 20 parts of pure aminodibenzanthrone, which may be obtained for example by reducing the pure nitrodibenzanthrone obtainable according to the process described in the U. S. Patent 1,513,851, are added. The mixture is then heated, while stirring, to a temperature of 170° C. and maintained at that temperature for about three hours or until none of the starting material can any longer be detected in an unaltered condition. When cooled, the mass is stirred into water, and worked up in the usual manner. A vat dyestuff is obtained which gives grey to black dyeings, of excellent fastness, from a blue vat.

When crude aminodibenzanthrone is used, a dyestuff of lower tinctorial strength is obtained.

Example 2

10 parts of aminodibenzanthrone are introduced into 60 parts of dimethyl sulfate and heated to about 170° C., this temperature being maintained for three hours. The product is worked up as in Example 1. The resulting vat dyestuff dyes cotton, from a blue vat, grey to black shades which have a more bluish tinge than the dyestuff obtained in Example 1.

The dimethyl sulfate may also be replaced by a mixture of dimethyl sulfate and sulfuric acid.

I claim:

1. As new article of manufacture, vat coloring matters dyeing cotton from a blue vat fast grey to black shades dissolving to a reddish violet solution in concentrated sulfuric acid, the color of the solution changing rather quickly to dark bluish green on addition of solid potassium nitrate, and on addition of a aqueous nitric acid first to green and blue and then to dull red and finally to brown red, being quite difficultly soluble in aniline to a green blue solution and more difficultly in boiling trichlorbenzene to a bluish solution with a red fluorescence, which dyestuffs may be obtained by treating aminodibenzanthrone with a methyl ester of sulfuric acid in the absence of agents capable of combining with acids.

2. The process of producing new vat coloring matters which consists in treating aminodibenzanthrone with a methyl ester of sulfuric acid in the absence of agents capable of combining with acids.

3. The process of producing new vat coloring matters which consists in treating aminodibenzanthrone with a mixture of methyl alcohol and concentrated sulfuric acid in the absence of agents capable of combining with acids.

In testimony whereof I have hereunto set my hand.

PAUL NAWIASKY.